(12) United States Patent
Meisel et al.

(10) Patent No.: US 9,817,021 B2
(45) Date of Patent: Nov. 14, 2017

(54) SENSOR SYSTEM INCLUDING TWO INERTIAL SENSORS

(71) Applicant: Robert Bosch GmbH, Stuttgart (DE)

(72) Inventors: Daniel Christoph Meisel, Reutlingen (DE); Thomas Kathmann, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/312,978

(22) Filed: Jun. 24, 2014

(65) Prior Publication Data
US 2014/0373625 A1 Dec. 25, 2014

(30) Foreign Application Priority Data

Jun. 25, 2013 (DE) .......................... 10 2013 212 118

(51) Int. Cl.
| | | |
|---|---|---|
| G01P 15/18 | (2013.01) | |
| G01C 19/5719 | (2012.01) | |
| G01P 15/125 | (2006.01) | |

(52) U.S. Cl.
CPC .......... *G01P 15/18* (2013.01); *G01C 19/5719* (2013.01); *G01P 15/125* (2013.01)

(58) Field of Classification Search
CPC .... G01P 15/18; G01P 15/125; G01C 19/5719
USPC ................................ 73/493, 514.32, 504.04
See application file for complete search history.

(56) References Cited

U.S. PATENT DOCUMENTS

| | | | | |
|---|---|---|---|---|
| 2003/0177832 | A1* | 9/2003 | Hatano ................... | G01P 15/18 73/514.33 |
| 2005/0076714 | A1* | 4/2005 | Sakai .................... | G01P 15/125 73/514.32 |
| 2007/0090474 | A1* | 4/2007 | Li .......................... | B81B 3/0078 257/414 |
| 2007/0119252 | A1* | 5/2007 | Adams ................ | G01P 15/0802 73/510 |
| 2007/0163346 | A1* | 7/2007 | Platt .................... | G01C 19/5719 73/504.16 |
| 2008/0055707 | A1* | 3/2008 | Kogut ................... | B81B 3/0072 359/291 |
| 2009/0282917 | A1* | 11/2009 | Acar ................... | G01C 19/5719 73/514.02 |
| 2010/0186508 | A1* | 7/2010 | Guenther ............... | G01C 25/00 73/504.14 |
| 2010/0297781 | A1* | 11/2010 | Scheurle ............. | B81C 1/00714 438/5 |
| 2011/0056295 | A1* | 3/2011 | Classen .................... | B81B 7/02 73/514.32 |
| 2012/0031186 | A1* | 2/2012 | Classen ................ | B81B 3/0045 73/514.32 |

(Continued)

FOREIGN PATENT DOCUMENTS

DE 102009029202 3/2011

*Primary Examiner* — Harshad R Patel
*Assistant Examiner* — Suman K Nath
(74) *Attorney, Agent, or Firm* — Norton Rose Fulbright US LLP; Gerard Messina

(57) ABSTRACT

A sensor system is described as including at least two micromechanical inertial sensors, which are movably connected to a substrate, each inertial sensor including a functional layer, the functional layers of the two inertial sensors varying in thickness, and the two inertial sensors being situated next to one another on the substrate.

16 Claims, 4 Drawing Sheets

(56) References Cited

U.S. PATENT DOCUMENTS

2013/0299927 A1\* 11/2013 Franke ................ B81B 3/0075
                                                                                                 257/417

\* cited by examiner

SENSOR SYSTEM INCLUDING TWO INERTIAL SENSORS

FIELD OF THE INVENTION

The present invention relates to a sensor system including two micromechanical inertial sensors as recited in claim 1.

BACKGROUND INFORMATION

In the related art, it is known from German Published Patent Application No. 10 2009 029 202 to provide a micromechanical arrangement including two inertial sensors, the inertial sensors being arranged one above the other and varying in thickness. The varying thickness refers to the thickness of the functional layer from which essential parts, in particular the inert body of the inertial sensors, are formed.

SUMMARY

An object of the present invention is to provide an improved sensor system including two micromechanical inertial sensors.

One advantage of the sensor system is that the two inertial sensors are formed from functional layers which vary in thickness. This makes possible an optimization of the sensor system. In particular, inertial sensors which allow for improvement of the mechanical oscillatory properties of the inertial sensors due to the varying thicknesses of the functional layers may be provided in a very small space. Because of the close arrangement of the inertial sensors next to one another, the material of the functional layers of the two inertial sensors has essentially the same mechanical, electrical and/or chemical properties, since the functional layers are in close proximity during production. Therefore, the production parameters are essentially identical, which means that the mechanical, electrical and/or chemical properties of the material of the functional layers are also identical.

The design of the at least two inertial sensors having a functional layer of varying thicknesses also offers the advantage that each inertial sensor may be optimized, for example, in terms of the Q-factor, capacitance, the mechanical stress in the functional layer, a perforation, a frequency location of the fault modes and/or normal modes in the case of oscillations and/or the rigidity of the functional layer.

The arrangement of the at least two inertial sensors on one substrate has the advantage that an external load, such as vibrations, acceleration, temperature and mechanical stress, is the same for the two inertial sensors. Moreover, identical process tolerances become effective during production as a result of the close arrangement of the two inertial sensors on one substrate. In addition, a precise orientation of the two inertial sensors relative to one another is achieved as a result of being produced on one substrate. Also possible is a simultaneous calibration of multiple measuring channels.

A functional layer of increased thickness, in the case of inertial sensors, for example, whose electrodes are arranged perpendicular to the substrate, also makes it possible to develop a greater capacitance given the same space requirements. In addition, the required oscillating mass of the inertial sensor may be adjusted independently of the space requirements by selecting the thickness of the functional layer. The arrangement of the inertial sensors on one substrate also saves on costs and space.

In addition, the arrangement of the inertial sensors next to one another on the substrate provides an arrangement which is simple and space-saving in design. The feature situated next to one another in one plane is also understood to mean an arrangement in which one inertial sensor surrounds at least partially or completely the second inertial sensor in one plane, in particular, the two inertial sensors surround one another in one plane or one inertial sensor completely surrounds the other inertial sensor in one plane.

In one specific embodiment, the first inertial sensor is designed as an acceleration sensor and the second inertial sensor is designed as a yaw rate sensor. In another specific embodiment, both inertial sensors are designed as acceleration sensors or as yaw rate sensors.

It is also possible, depending on the specific embodiment selected, for three inertial sensors to be situated next to one another, at least two or all three inertial sensors having different layer thicknesses. For example, a first inertial sensor may be designed as a yaw rate sensor and the two other inertial sensors may be designed as acceleration sensors.

It is possible, depending on the specific embodiment selected, for a functional layer of an inertial sensor to have a thickness of between 0.5 µm and 100 µm. In addition, a difference in thickness of the functional layers of the at least two inertial sensors may, depending on the selected specific embodiment, lie in the region of at least 1 µm.

It is possible, depending on the specific embodiment selected, for the functional layer of the first inertial sensor to have a thickness of between 5 µm and 50 µm, and the functional layer of the second inertial sensor to have a thickness of between 0.5 µm and 5 µm. In particular, the first acceleration sensor may have a layer thickness in the region of 2 µm. The second acceleration sensor may have a layer thickness in the region of 20 µm. The yaw rate sensor may have a layer thickness in the region of 10 µm. This provides an improved arrangement of inertial sensors.

In one specific embodiment, the first inertial sensor includes a lattice structure on which movable electrodes are formed. Provided on the substrate are counter electrodes. The lattice structure is connected to the substrate via multiple spring elements. A simple acceleration sensor is provided in this way.

In another specific embodiment, the second inertial sensor is designed as a rocker sensor. The mass of the rocker sensor is formed from the functional layer and affixed to the substrate via a torsion spring.

In another specific embodiment, one inertial sensor includes a trampoline structure, a trampoline mass being formed from the functional layer, and the trampoline mass being affixed via springs to the substrate.

In another specific embodiment, the first inertial sensor includes a functional layer having a thickness in the range between 5 µm and 50 µm. With these layer thicknesses, it is possible, for example, to produce acceleration sensors having good damping properties.

In another specific embodiment, the second inertial sensor includes a functional layer which has a thickness in the range of 0.5 µm to 5 µm. Preferably, the functional layers are produced from an epitaxially grown semiconductor layer.

In another specific embodiment, each inertial sensor is situated in an air-tight or gas-tight cavity. In this way, it is possible to produce varying air pressures or gas pressures in the cavities. This supports the different functionalities of the inertial sensors.

The arrangement of the inertial sensors in the cavities protects the inertial sensors from external influences. In addition, a gas pressure may be held ready for yaw rate sensors which is lower than that for acceleration sensors.

In another specific embodiment, the functional layer of at least one inertial sensor includes polysilicon or is formed from polysilicon. Polysilicon is especially well suited for producing on one substrate the inertial sensors having functional layers of varying thickness.

In another specific embodiment, the functional layers of two inertial sensors are linked to one another via a connection element. An advantageous mechanical coupling of the two inertial sensors may be achieved in this manner.

DETAILED DESCRIPTION

Figure 1:
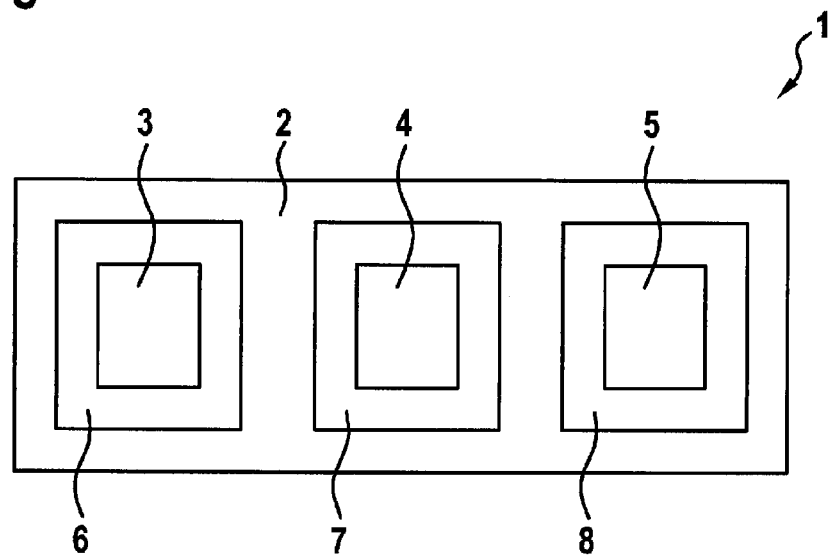
FIG. 1 schematically shows a top view of a substrate including multiple inertial sensors.

FIG. 1 schematically shows a top view of an arrangement 1, which includes a substrate 2, a micromechanical first inertial sensor 3, a micromechanical second inertial sensor 4 and a micromechanical third inertial sensor 5. Substrate 2 may, for example, be designed as a silicon substrate as part of a silicon wafer, on which inertial sensors 3, 4, 5 have been produced. Depending on the specific embodiment selected, only two micromechanical inertial sensors, for example, may also be provided. In addition, six micromechanical inertial sensors, for example, may also be provided. In such a case, three inertial sensors may be provided, for example, for detecting an acceleration along the three orthogonal spatial axes and three inertial sensors may be provided for detecting the yaw rates about the three orthogonal spatial axes. In the specific embodiment shown, each of inertial sensors 3, 4, 5 is enclosed by a cap 6, 7, 8 in a gas-tight cavity. Caps 6, 7, 8 are formed, for example, from silicon or glass and are hermetically sealed to the surface of substrate 2. Inertial sensors 3, 4, 5 may, depending on the specific embodiment selected, also be situated in cavities of substrate 2, with openings of the cavities on the upper side of substrate 2 being covered with corresponding layers formed, for example, from polysilicon or glass. At least one of caps 6, 7, 8 may be eliminated, depending on the specific embodiment selected. Moreover, in one specific embodiment, multiple inertial sensors may also be situated in one cavity under one cap.

Substrate 2 and three micromechanical inertial sensors 3, 4, 5 are produced, for example, in such a way that conductive functional layers and insulating sacrificial layers are deposited on one substrate wafer, which consists, for example, of polycrystalline silicon or of oxides. Movable micromechanical elements are fabricated from one functional layer and mechanically released via removal of the underlying sacrificial layer. The movable micromechanical elements represent inertial sensors 3, 4, 5.

Figure 2:
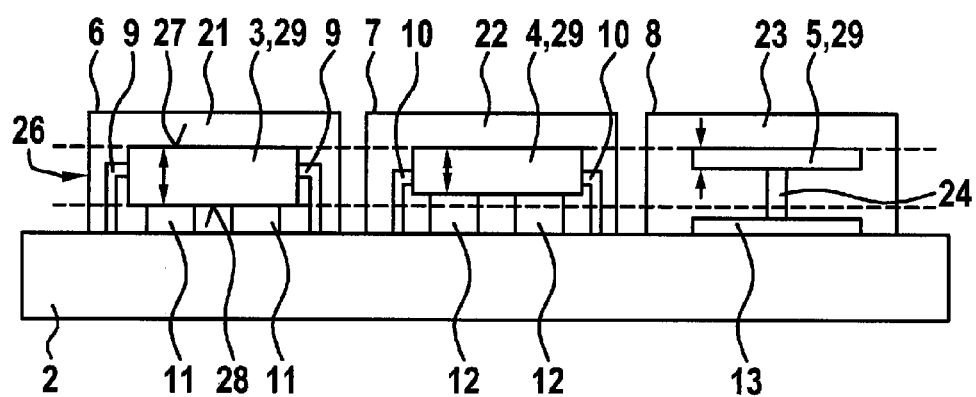
FIG. 2 schematically shows a side view of the substrate including three inertial sensors.

FIG. 2 schematically shows a side view of the arrangement of FIG. 1 including cavities 21, 22, 23, in which the inertial sensors are situated. The gas pressures in cavities 21, 22, 23 may be at various levels. In particular, the pressure in a cavity in which a yaw rate sensor is situated may be lower than in a cavity in which an acceleration sensor is situated. The layer thicknesses of at least two of the inertial sensors 3, 4, 5 are differently designed. The layer thicknesses of the functional layers of the three inertial sensors 3, 4, 5 are delineated schematically in FIG. 2 in the form of arrows. In the exemplary embodiment selected, the first inertial sensor 2 has a layer thickness greater than that of the second inertial sensor 4. The second inertial sensor 4 has a layer thickness greater than that of the third inertial sensor 5. The first inertial sensor 3 is movably fixed to substrate 2 via the first spring element 9. The second inertial sensor 4 is movably mounted on substrate 2 via the second spring element 10. The third inertial sensor 5 is movably mounted on substrate 2 via the third spring element 24.

The functional layers 29 of three inertial sensors 3, 4, 5 are situated next to one another in a virtual planar layer 26 which is delineated by dashed lines. Planar layer 26 is situated parallel to a surface or a center plane of substrate 2. For example, the height of planar layer 26 is defined by an upper side 27 and a lower side 28 of the inertial sensors having the greatest layer thickness of functional layer 29. The height and position of the planar layer may, depending on the specific embodiment selected, also be defined separately therefrom, as shown in FIG. 2.

The first inertial sensor 3 includes on an underside of functional layer 29 first electrodes, with which first fixed electrodes 11 of substrate 2 are associated. First fixed electrodes 11 are schematically delineated in FIG. 2. The second inertial sensor 4 includes on an underside of functional layer 29 second electrodes, with which second fixed electrodes 12 are associated. The second fixed electrodes 12 are schematically delineated in FIG. 2. The fixed first and second electrodes 11, 12 extend as far as the area of the functional layer of the first and second inertial sensors 3, 4.

The third inertial sensor 5 is designed in the form of a rocker sensor. The rocker sensor is connected to substrate 2 via the third spring element 24. In addition, the third inertial sensor 5 includes third electrodes not shown on an underside of the functional layer, i.e., a part of the functional layer functions as a movable counter electrode relative to fixed electrodes 13, which are formed on substrate 2. The electrodes are contacted with electrical leads in order to detect a movement or change of movement of the inertial sensors or a force acting on the inertial sensors with the aid of an evaluation circuit based on electrical signals.

Functional layer 29 of at least one or multiple inertial sensors may have a thickness of between 0.5 µm and 100 µm. Preferably, the difference in the layer thickness is at least 1 µm. In addition, functional layer 29 of the first inertial sensor 3 may have a thickness of between 5 µm and 50 µm. Moreover, functional layer 29 of the second or third inertial sensors 4, 5 may have a thickness of between 0.5 µm and 5 µm.

Functional layer 29 of at least one inertial sensor 3, 4, 5 may include at least polysilicon or be formed from polysilicon. In one specific embodiment, functional layer 29 of the first inertial sensor 3, designed preferably as an acceleration sensor, has a thickness between 0.5 µm and 5 µm, functional layer 29 of the second inertial sensor 4, designed preferably as an acceleration sensor, having a thickness between 5 µm and 50 µm, and a third inertial sensor 5, designed for example as a yaw rate sensor, including a functional layer 29 having a thickness between 5 µm and 50 µm.

Figure 3:
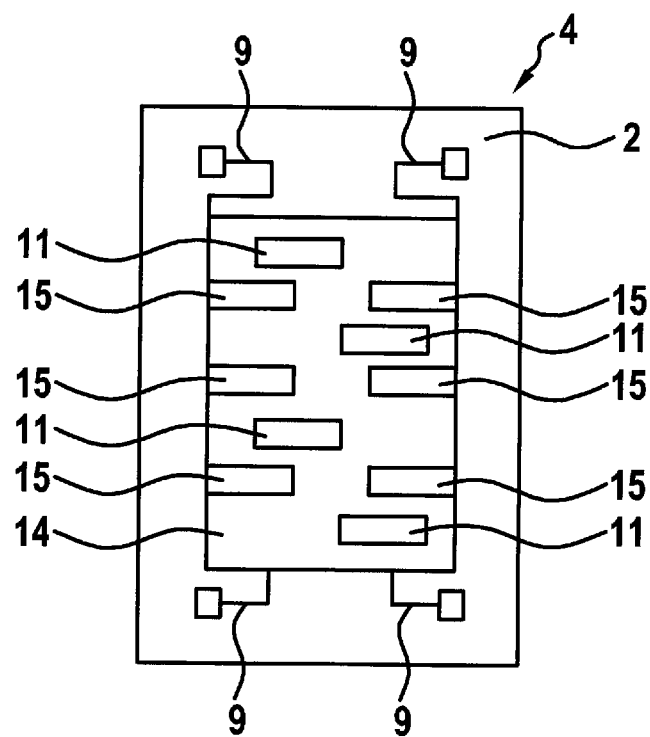
FIG. 3 schematically shows a representation of an acceleration sensor, which includes a lattice structure.

FIG. 3 schematically shows a representation of a specific embodiment for a second inertial sensor 4 in the form of an acceleration sensor or a yaw rate sensor. For example, the first and/or second inertial sensors 3, 4 may be designed in the form of the inertial sensor shown. The first inertial sensor 3 includes a frame 14 which includes finger structures (interdigital structures) 15. Finger structures 15 are designed as movable electrodes because of the mobility of the frame. The finger structures 15 are associated with fixed first electrodes 11 of substrate 2. Frame 14 is connected to substrate 2 via first spring elements 9 and is therefore movably mounted. The first spring elements 9 are designed, for example, in the form of U-shaped or S-shaped spring bars/springs. A first end of spring element 9 is connected to frame 14 and a second end of spring element 9 is connected to substrate 2 or via a connecting bar to substrate 2. Frame 14 and finger structures 15 are formed from the functional layer and have the thickness of the functional layer.

Figure 4:
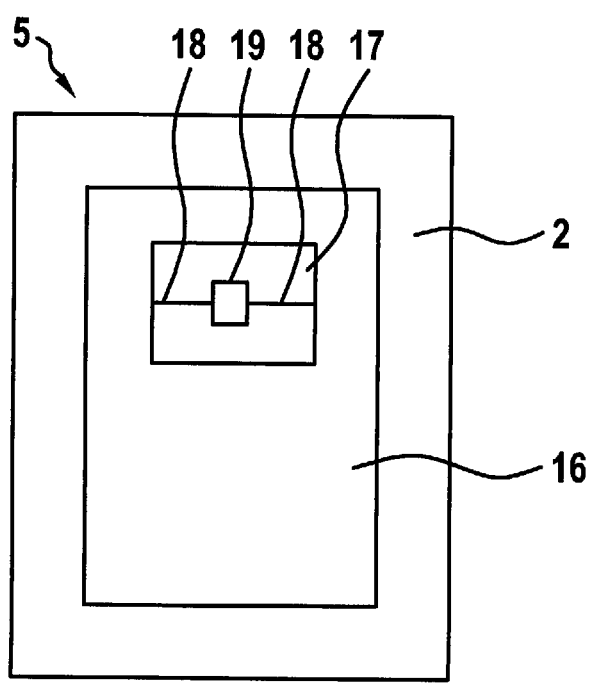
FIG. 4 schematically shows a representation of another inertial sensor in the form of a rocker structure.

FIG. 4 shows a third inertial sensor 5, which is designed in the form of a rocker 16. Rocker 16 includes a recess 17. Provided in recess 17 is a spring 18 in the form of a torsion bar, which is linked to a connecting bar 19 of substrate 2. The mass of rocker 16 is situated unevenly with respect to the rotational axis of torsion bar 18. Formed on the underside of rocker 16 are movable electrodes of the inertial sensor. The associated fixed electrodes are formed on the upper side of substrate 2. A method for producing the corresponding inertial sensor structures is known, for example, from German Published Patent Application No. 10 2009 029 202.

Figure 5:
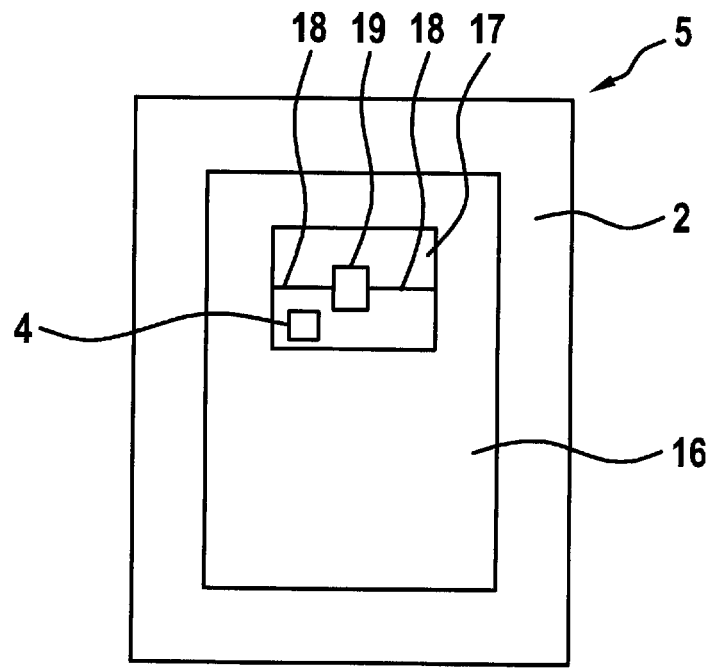
FIG. 5 schematically shows a representation of a rocker structure including a yaw rate sensor.

FIG. 5 shows another specific embodiment which shows essentially an inertial sensor having a rocker 16 according to FIG. 4, an additional sensor 2 being provided, however, in the area of recess 17, which is designed, for example, according to FIG. 3. Thus, rocker 16 of FIG. 4 surrounds a first inertial sensor 3. An inertial sensor may, depending on the specific embodiment selected, also only partially surround one other inertial sensor. As a result of the at least partial surrounding of the inertial sensors in a plane, in particular in a planar layer, it is possible to produce the inertial sensors with minimal space requirements, resulting in cost savings as well.

Figure 6:
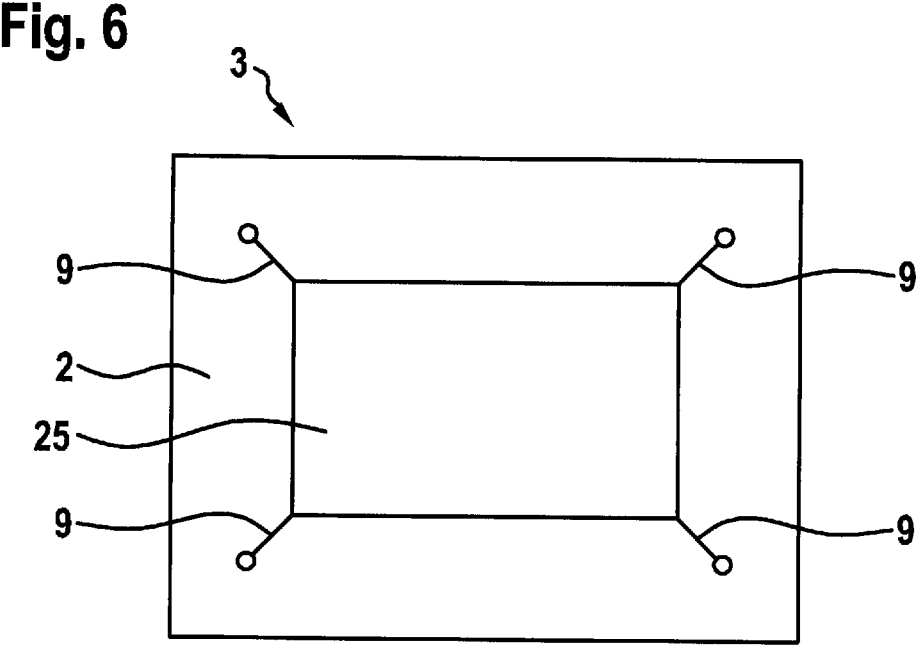
FIG. 6 schematically shows a representation of a trampoline structure.

FIG. 6 shows another specific embodiment of one first inertial sensor 3 having a trampoline structure. In this specific embodiment a trampoline mass 25 is provided which is formed from the functional layer. Trampoline mass 25 is fixed to substrate 2 via four springs 9. The springs may, for example, be designed as straight bars. Situated on the underside of trampoline mass 25 are movable electrodes. Associated with the movable electrodes are fixed electrodes which are situated on the upper side of substrate 2. As a result of the spring suspension, trampoline mass 25 may oscillate when the inertial sensor is moved, causing a change of capacitance of the electrodes.

Figure 7:
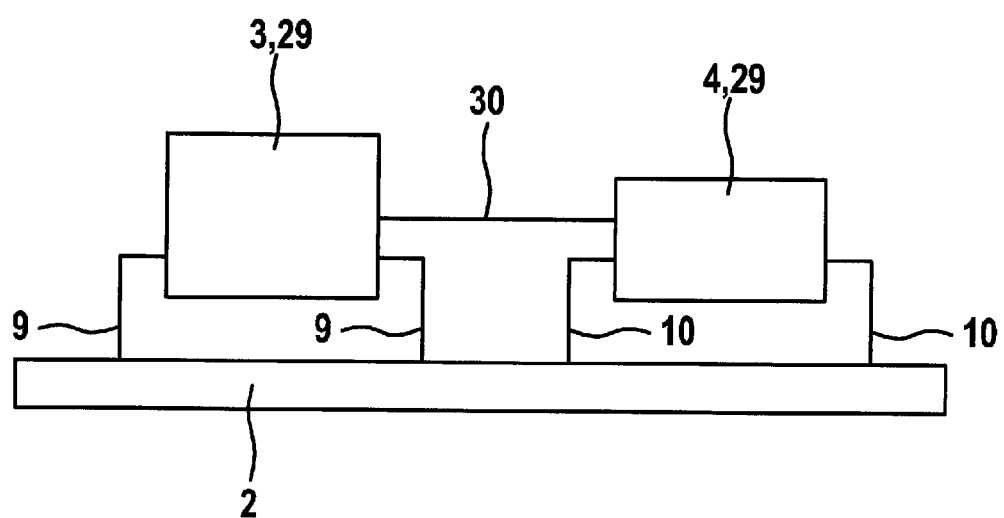
FIG. 7 shows another specific embodiment including two coupled functional layers of two inertial sensors.

FIG. 7 schematically shows a representation of another specific embodiment, in which two functional layers 29 of two inertial sensors 3,4 situated on a substrate 2 are connected via a mechanical connection element 30. Functional layers 29 of two inertial sensors 3,4 have different thicknesses. Inertial sensors 3,4 are designed, for example, as was explained with reference to FIG. 2. Mechanical connection element 30 is formed, in particular, from the same material as functional layers 29. In addition, connection element 30 may also be designed as a rigid connection or as a flexible connection, in particular as a spring element.

What is claimed is:

1. A sensor system, comprising:
a substrate;
at least two micromechanical inertial sensors that are movably connected to the substrate, wherein:
each inertial sensor includes a functional layer,
the functional layers of the at least two inertial sensors vary in thickness along a direction perpendicular to the substrate,
the at least two inertial sensors are situated next to one another on the substrate,
a difference in a layer thickness of the at least two inertial sensors is at least 1 µm; and
a plurality of fixed electrodes that extend perpendicular to the substrate, wherein:
a first fixed electrode located directly below a first inertial sensor along the direction perpendicular to the substrate extends to a first height from the substrate along the direction perpendicular to the substrate;
a second fixed electrode located directly below a second inertial sensor along the direction perpendicular to the substrate extends to a second height from the substrate along the direction perpendicular to the substrate;
the first height and the second height are different;
the first fixed electrode extends up from the substrate to the first height towards the functional layer of the first inertial sensor; and
the second fixed electrode extends up from the substrate to the second height towards the functional layer of the second inertial sensor.

2. The sensor system as recited in claim 1, wherein at least one of the inertial sensors is an acceleration sensor and another of the inertial sensors is a yaw rate sensor.

3. The sensor system as recited in claim 1, wherein one of:
both inertial sensors are acceleration sensors, and
both inertial sensors are yaw rate sensors.

4. The sensor system as recited in claim 1, further comprising:
a plurality of spring elements, wherein:
one of the inertial sensors includes a frame which includes a plurality of finger structures,
the frame is formed from the functional layer, and
the frame is connected to the substrate via the spring elements.

5. The sensor system as recited in claim 1, further comprising:
a spring, wherein:
a third inertial sensor includes a rocker mass,
the rocker mass is formed from the functional layer, and
the rocker mass is fixed to the substrate via the spring.

6. The sensor system as recited in claim 1, further comprising:
a plurality of springs, wherein:
a third inertial sensor includes a trampoline mass formed from the functional layer, and
the trampoline mass is fixed to the substrate via the springs.

7. The sensor system as recited in claim 1, wherein the functional layer of at least one of the inertial sensors has a thickness of between 0.5 µm and 100 µm.

8. The sensor system as recited in claim 7, wherein:
the functional layer of a first one of the inertial sensors has a thickness between 0.5 µm and 5 µm,
the functional layer of a second one of the inertial sensors has a thickness between 5 µm and 50 µm, and the functional layer of a third one of the inertial sensors has a thickness between 5 μm and 50 μm.

9. The sensor system as recited in claim 8, wherein:
the first one of the inertial sensors is a first acceleration sensor,
the second one of the inertial sensors is a second acceleration sensor, and
the third one of the inertial sensors is a yaw rate sensor.

10. The sensor system as recited in claim 9, wherein:
the first inertial sensor detects an acceleration in a z-direction perpendicular to the substrate, and
the second inertial sensor detects an acceleration in an x-direction parallel to the substrate.

11. The sensor system as recited in claim 1, wherein the functional layer of a first of the inertial sensors has a thickness of between 5 μm and 50 μm.

12. The sensor system as recited in claim 11, wherein the functional layer of a second of the inertial sensors has a thickness of between 0.5 μm and 5 μm.

13. The sensor system as recited in claim 1, wherein the functional layers of the inertial sensors is an epitaxial semiconductor layer.

14. The sensor system as recited in claim 1, further comprising:
a plurality of gas-tight cavities within each of which a gas pressure predominates that differs from those of the other gas-tight cavities, wherein the inertial sensors are each situated respectively in a corresponding one of the gas-tight cavities.

15. The sensor system as recited in claim 1, wherein the functional layer of at least one of the inertial sensors one of includes at least polysilicon and is formed from polysilicon.

16. The sensor system as recited in claim 1, further comprising:
a connection element, wherein the functional layers of at least two of the inertial sensors are connected to one another via the connection element.

* * * * *